US008224157B2

(12) United States Patent
Nam et al.

(10) Patent No.: US 8,224,157 B2
(45) Date of Patent: Jul. 17, 2012

(54) METHOD AND APPARATUS FOR EXTRACTING SPATIO-TEMPORAL FEATURE AND DETECTING VIDEO COPY BASED ON THE SAME IN BROADCASTING COMMUNICATION SYSTEM

(75) Inventors: Jeho Nam, Daejon (KR); Joosub Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 310 days.

(21) Appl. No.: 12/569,305

(22) Filed: Sep. 29, 2009

(65) Prior Publication Data
US 2010/0247073 A1 Sep. 30, 2010

(30) Foreign Application Priority Data

Mar. 30, 2009 (KR) .......... 10-2009-0027143
Sep. 23, 2009 (KR) .......... 10-2009-0090280

(51) Int. Cl.
*H04N 9/80* (2006.01)
(52) U.S. Cl. ....................................... 386/252
(58) Field of Classification Search .......... 382/100, 382/225; 386/241, 252; 725/22; 707/999.107; 348/645
See application file for complete search history.

(56) References Cited

U.S. PATENT DOCUMENTS

| 7,532,804 | B2 * | 5/2009 | Kim | 386/252 |
| 2007/0242162 | A1 * | 10/2007 | Gutta et al. | 348/645 |
| 2007/0268966 | A1 | 11/2007 | Kim | |
| 2008/0152225 | A1 | 6/2008 | Iwamoto | |
| 2009/0049103 | A1 * | 2/2009 | Takahashi et al. | 707/104.1 |
| 2009/0324199 | A1 * | 12/2009 | Haitsma et al. | 386/95 |
| 2010/0027969 | A1 * | 2/2010 | Alattar | 386/94 |
| 2010/0049711 | A1 * | 2/2010 | Singh et al. | 707/6 |
| 2011/0222787 | A1 * | 9/2011 | Thiemert et al. | 382/225 |

FOREIGN PATENT DOCUMENTS

| JP | 2004-062644 A | 2/2004 |
| KR | 1020060030112 A | 4/2006 |
| KR | 100827229 B1 | 11/2007 |
| KR | 100811835 B1 | 3/2008 |

OTHER PUBLICATIONS

Joosub Kim, et al; "Video Copy Detection Algorithm Against Online Piracy of DTV Broadcast Program", Journal of Broadcast Engineering, pp. 662-676, Sep. 2008 (Exact Publication Date Cannot Be Found).

* cited by examiner

*Primary Examiner* — Thai Tran
*Assistant Examiner* — Stephen Smith
(74) *Attorney, Agent, or Firm* — Ladas & Parry LLP (57) ABSTRACT

An apparatus for extracting spatio-temporal feature and detecting video copy based on the same in a broadcasting communication system, the apparatus includes: an original video feature extractor configured to receive an original video and extract spatio-temporal feature of the original video; an original video feature database configured to store the extracted feature; a query video feature extractor configured to receive a query video and extract spatio-temporal feature of the query video; and a feature comparison and decision unit configured to compare the spatio-temporal feature of the original video and the spatio-temporal feature of the query video and decide similarity of the original video and the query video based on the spatio-temporal features of the original video and the query video.

20 Claims, 7 Drawing Sheets

$\underline{begin}$ $\underline{initialize}$ $i=0$, $N=\#keyframe$ of Query, SegLen=0, TotalSegLen=0, FailCount=0
    $\underline{do}$ $i \leftarrow i+1$
       $\underline{if}$ SegLen $\leq 3$
          $\underline{then}$ $\underline{if}$ $\tilde{k}_i = \tilde{k}_{i-1} + 1$ $\underline{then}$ SegLen $\leftarrow$ SegLen + 1
             $\underline{else}$ $\underline{then}$ TotalSegLen $\leftarrow$ TotalSegLen + SegLen, SegLen $\leftarrow$ 0
      $\underline{else}$ $\underline{if}$ SegLen $> 3$
           $\underline{then}$ $\underline{if}$ $\tilde{k}_{i-1} + 1 \leq \tilde{k}_i \leq \tilde{k}_{i-1} + \gamma$
               $\underline{then}$ FailCount $\leftarrow$ 0, SegLen $\leftarrow$ SegLen + 1
               $\underline{else}$ $\underline{if}$ FailCount $< 3$
                   $\underline{then}$ FailCount $\leftarrow$ FailCount + 1
                   $\underline{else}$ TotalSegLen $\leftarrow$ TotalSegLen + $\beta$SegLen, SegLen $\leftarrow$ 0
    until $i > N$
    Corr $\leftarrow \dfrac{TotalSegLen}{\beta N}$
    $\underline{if}$ Corr $> T_c$ then return Copy
    $\underline{else}$ return No Copy
$\underline{end}$

METHOD AND APPARATUS FOR EXTRACTING SPATIO-TEMPORAL FEATURE AND DETECTING VIDEO COPY BASED ON THE SAME IN BROADCASTING COMMUNICATION SYSTEM

CROSS-REFERENCE(S) TO RELATED APPLICATIONS

The present invention claims priority of Korean Patent Application Nos. 10-2009-0027143 and 10-2009-0090280 filed on Mar. 30, 2009 and Sep. 23, 2009, which are incorporated herein by reference in its entirety.

BACKGROUND OF THE INVENTION

1. Field of the Invention

The present invention relates to an apparatus and method for extracting spatio-temporal feature and detecting video copy based on the same; and, more particularly, to an apparatus and method for extracting spatio-temporal feature and determining whether or not video is copied based on the spatio-temporal feature in a broadcasting communication system.

2. Description of Related Art

A large broadcasting contents made in Korea, which is a point of the Korean wave, is illegally circulated in abroad as well as in Korean through the Internet. The illegal circulation costs the great loss to the contents provider. Especially, as the merge of broadcast and communication is accelerated, a scale of copyright infringement has been enlarged. Accordingly, the government and the copyright protection organization concentrate on various efforts for preventing from the illegal copy of the contents by revising the copyright law and by enforcing control and punishment of an illegal work. Especially, the complete revised copyright law includes an article to make it mandatory for an Online Service Provider (OSP) of special type recording media such as Peer-to-peer (P2P), web storage, and the like to perform 'a technological action (filtering) for cutting off transmission of the illegal work'.

Filtering technology of an illegal work cuts off illegal Internet transmission of a copyright infringement by determining whether a video, music, a game, and the like circulated in on-line is an illegal work or not. The filtering technology of an illegal work should have a contents identification function. That is, the filtering technology extracts features that are unique characteristics of the contents, and determines whether or not the illegal contents is the same as the rightful contents by comparing the features of the rightful contents and the illegal contents. Here, what feature is used acts important role to decide performance of filtering technology that is cutoff rate of the illegal work.

The filtering technology may greatly be divided by a text filtering scheme based on a title, a string, an extension, and the like; a filtering scheme using comparison of a unique hash value existing in a file; and a content-based filtering scheme using audio/video recognition technology. The text-filtering scheme establishes the specified restrict words and does not allow the restrict words to be used in searching. The text-filtering scheme may be classified by a title filtering, a string comparing scheme, an extension filtering, and the like. The text-filtering scheme establishing the specified restrict word may easily be incapacitated, because various roundabout and evasion methods are possible.

The content-based filtering scheme, which is different from the text-filtering scheme, does not use a key word for searching. The content-based filtering scheme extracts a unique pattern of contents as features and performs filtering based on the feature. Also, even though a file including contents is copied, the contents itself is not easily changed in a different way from a filtering scheme using comparison of hash values. Therefore, the content-based filtering scheme is recognized by filtering technology that has the most superior performance.

Also, a content-based video searching algorithm and a video copy detection algorithm through video feature extraction may be classified into a method using a global feature of each video frame; a method using the mixed spatio-temporal feature; and a method using a local feature.

A color histogram based searching method uses a histogram of the global screen color that is distributed in every video frame as features. However, the color histogram based searching method may be very sensitive to a little color change due to conversion of a video format (e.g. MPEG, AVI, WMV, and the like) or visual quality, because the color histogram based searching method does not consider spatial position information of colors in the frame.

Since most of content-based video searching and detection algorithms extracts features on frame-by-frame basis and compares the features of all frames, the content-based video searching and detection methods would need a lot of computation time in the case of vast size of database. Recently, the size and volume of videos, such as a movie and a broadcasting content, are rapidly increasing. Accordingly, processing time is very important factor to improve performance of video copy detection.

Also, a conventional detection algorithm considers a few of edit effects that are applied to illegal copy video. In recent, a general user can easily apply various video edition effects to distributed videos like User Created Contents (UCC) edition according to active distribution of video edition software. Therefore, considering these situations, there is a need that a feature extraction and copy detection method is robust to video edition effects and has a high calculation speed for fast computation of mass video data.

SUMMARY OF THE INVENTION

An embodiment of the present invention is directed to provide an apparatus and a method for extracting a feature and detecting video copy of which processing time is improved.

Another embodiment of the present invention is directed to provide an apparatus and a method for extracting a feature and detecting video copy considering various edition effects.

Another embodiment of the present invention is directed to provide an apparatus and a method for extracting a feature and detecting video copy which can easily detect a copy.

In accordance with an aspect of the present invention, there is provided an apparatus for extracting spatio-temporal feature and detecting video copy based on the same in a broadcasting communication system, including: an original video feature extractor configured to receive an original video and extract spatio-temporal feature of the original video; an original video feature database configured to store the extracted feature; a query video feature extractor configured to receive a query video and extract spatio-temporal feature of the query video; and a feature comparison and decision unit configured to compare the spatio-temporal feature of the original video and the spatio-temporal feature of the query video and decide similarity of the original video and the query video based on the spatio-temporal features of the original video and the query video.

In accordance with another aspect of the present invention, there is provided a method for extracting spatio-temporal feature for video copy detection in a broadcasting communication system, including: dividing a video frame into a plurality of blocks and calculating an average luminance value of the blocks each having a luminance value, wherein video contents includes a plurality of video frames; applying a spatial weight to the average luminance value, to thereby generate a weighted average luminance value of the video frame; calculating differential luminance difference of the weighted average luminance value of the video frame; selecting the video frame having abrupt luminance change when a local threshold is applied to the differential luminance difference of the video frame, as a keyframe of the video contents; and calculating spatio-temporal feature of the video contents based on temporal and spatial characteristic of the keyframe.

In accordance with another aspect of the present invention, there is provided a method for detecting video copy based on spatio-temporal feature in a broadcasting communication system, including: extracting keyframe feature of an original video; extracting keyframe feature of a query video; comparing the extracted keyframe feature of the original video and the extracted keyframe feature of the query video; and calculating similarity between the original video and the query video and determining whether the query video is a copy of the original video or not based on the calculated similarity.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
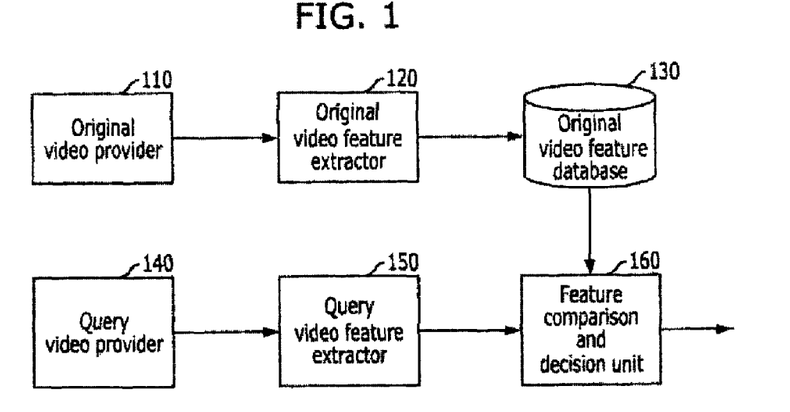
FIG. 1 is a block diagram illustrating a feature extraction and decision apparatus for video copy detection in accordance with an embodiment of the present invention.

FIG. 1 is a block diagram illustrating a feature extraction and decision apparatus for video copy detection in accordance with an embodiment of the present invention.

As shown in FIG. 1, a feature extraction and decision apparatus for video copy detection includes an original video provider 110, an original video feature extractor 120, an original video feature database 130, a query video provider 140, a query video feature extractor 150, and a feature comparison and decision unit 160. Operating procedures of the feature extraction and decision apparatus for video copy detection will be described hereinafter with reference to FIG. 1.

The original video provider 110 transmits an original video to the original video feature extractor 120. The original video feature extractor 120 extracts feature of the original video provided from the original video provider 110 and transfers the extracted feature to the original video feature database 130. The original video feature database 130 stores the original video feature transferred from the original video feature extractor 120 and transfers the original video feature to the feature comparison and decision unit 160. The query video provider 140 transfers a query video to be compared with the original video to the query video feature extractor 150. The query video feature extractor 150 extracts feature of the query video and transmits the extracted feature to the feature comparison and decision unit 160. The feature comparison and decision unit 160 compares the original video and the query video by using the original video feature that is stored in the original video feature database 130 and the query video feature that is extracted from the query video feature extractor 150, and decides similarity of the original video and the query video.

Figure 2:
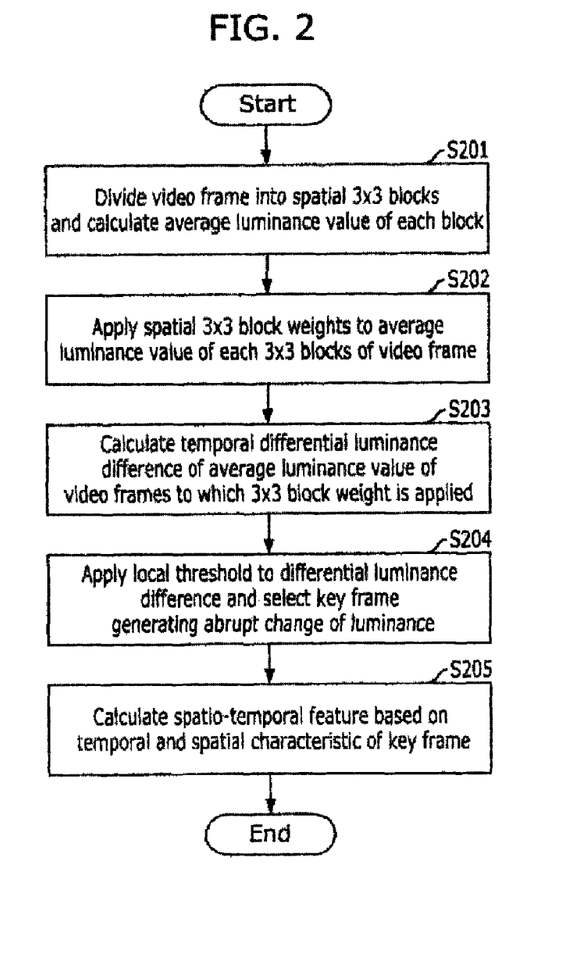
FIG. 2 is a flowchart showing a method for extracting a keyframe-based spatio-temporal feature for video copy detection in accordance with an embodiment of the present invention.

FIG. 2 is a flowchart showing a method for extracting a keyframe-based spatio-temporal feature for video copy detection in accordance with an embodiment of the present invention.

A video frame is divided into 3×3 blocks and an average luminance value of each block is calculated at step S201. At step S202, a spatial weight is applied to the average luminance value of each of 3×3 blocks calculated at step S201. Hereinafter the weight applied to 3×3 blocks is referred to as "3×3 blocks weight". At step S203, temporal differential luminance difference of the weighted average luminance of the video frame to which 3×3 blocks weight is applied at step S202 is calculated. At step S204, a local threshold is applied to the differential luminance difference that is calculated at step S203, and a keyframe in which abrupt change of luminance occurs is selected. At step S205, spatio-temporal feature is calculated by using temporal and spatial characteristic of the keyframe selected at step S204.

Figure 3:
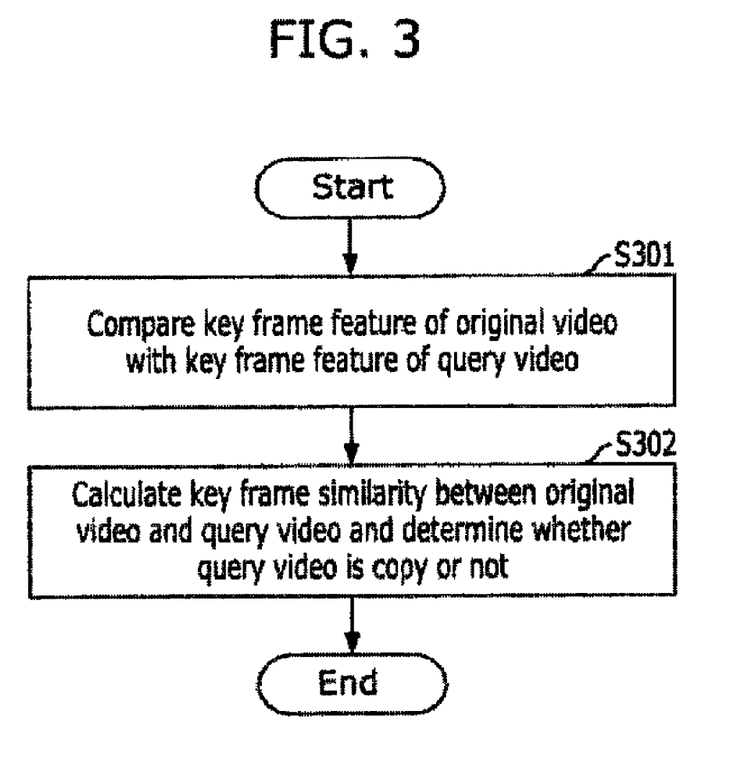
FIG. 3 is a flowchart showing a method for comparing a feature of a reference video with a feature of a query video in order for video copy detection.

FIG. 3 is a flowchart showing a method for comparing a feature of a reference video and a feature of a query video for video copy detection.

The reference video means an original video having copyright and is used to determine whether or not the query video is the same as the reference video. At step S301, keyframe feature of the original video is compared with keyframe feature of the query video. Similarity between keyframes of the original video and the query video is calculated and it is determined whether or not the query video is a copy of the original video.

A video copy detection method as mentioned above will be described by using equations and examples hereinafter. The video copy detection method based on spatio-temporal feature of keyframe includes a process of dividing luminance components of the video frame into blocks and applying a spatial weight to the average luminance of each block; an analysis process of image luminance component; a keyframe selection process through applying a local threshold; a spatio-temporal feature extraction process; and a feature comparison process. Hereinafter, the above processes will be described.

<Division of Luminance Components of Video Frame into Blocks and Application of Spatial Weight to each Block>

Analysis of video information may be performed through not only luminance but also various video features, e.g., color, texture, format, motion and object. However, in this embodiment, only an average luminance value is described as a feature for video analysis, because the average luminance value is efficient for calculation of a mass video data and has robustness. Luminance is a photometric measure of the density of luminous intensity in a given direction. It describes the amount of light that passes through or is emitted from a particular area, and falls within a given solid angle. Luminance is calculated by $L_v = d^2 F / d\vec{A} \cdot d\vec{\Omega}$. Here, $L_v$ is a luminance value, F is a light velocity, $\vec{A}$ is area vector, and $\vec{\Omega}$ is a solid angle vector. In order to measure change of video luminance, each of the video frames is divided into 3×3 blocks, and an average luminance value of each block is calculated. The average luminance value of each block has strong characteristic for format conversion and local conversion. Also, a spatial weight can be applied to each block by dividing the frame into 3×3 blocks.

Figure 4:
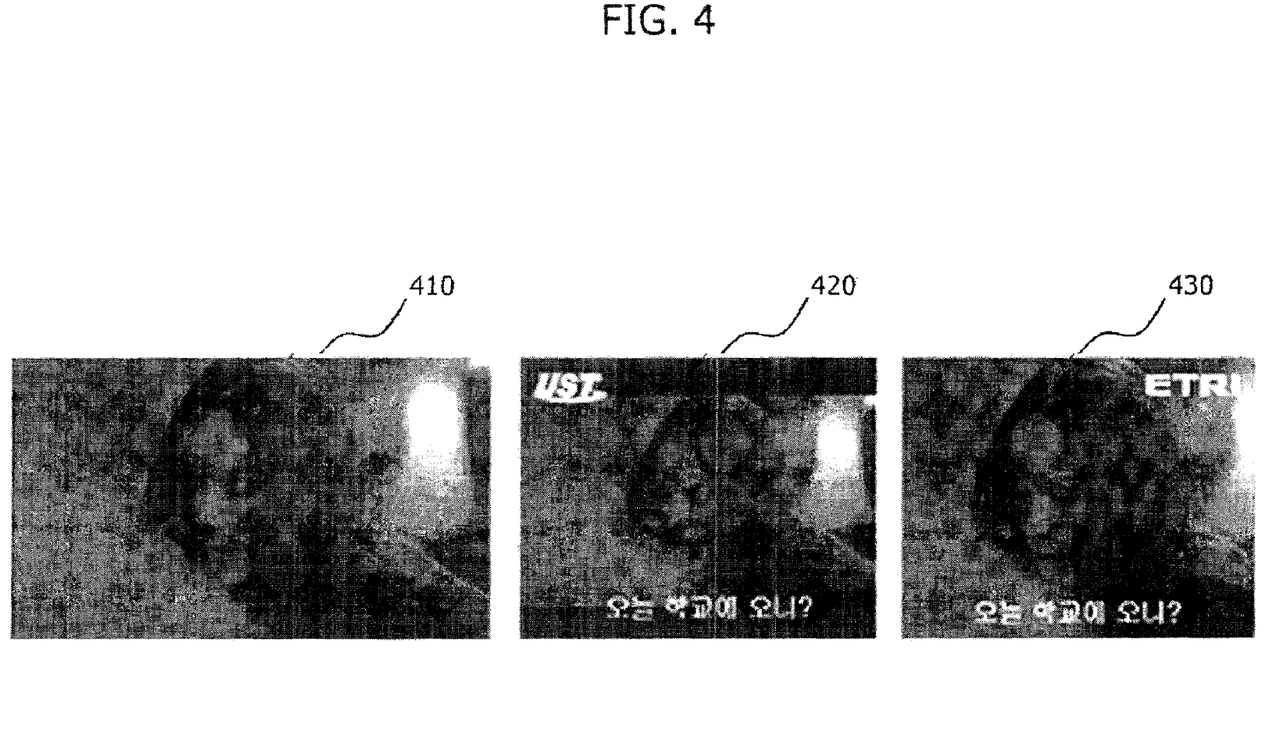
FIG. 4 is a diagram illustrating video edition effect in accordance with insertion of a caption and a logo and conversion of aspect ratio.

FIG. 4 is a diagram illustrating video edition effect in accordance with insertion of a caption and a logo and conversion of aspect ratio.

The reference numeral 410 denotes an original image, and the reference numeral 420 denotes an image generated by inserting an up-down end frame to the original image 410. The reference numeral 430 denotes an image generated by cropping the left-right part from the original image 410. As shown in FIG. 4, editing position of an image is the edge or the up-down area of the image, i.e., an area excluding the center of the image. Because a great obstacle is generated in transferring important information of the image, if the center area of the image is damaged by an edition.

Figure 5:
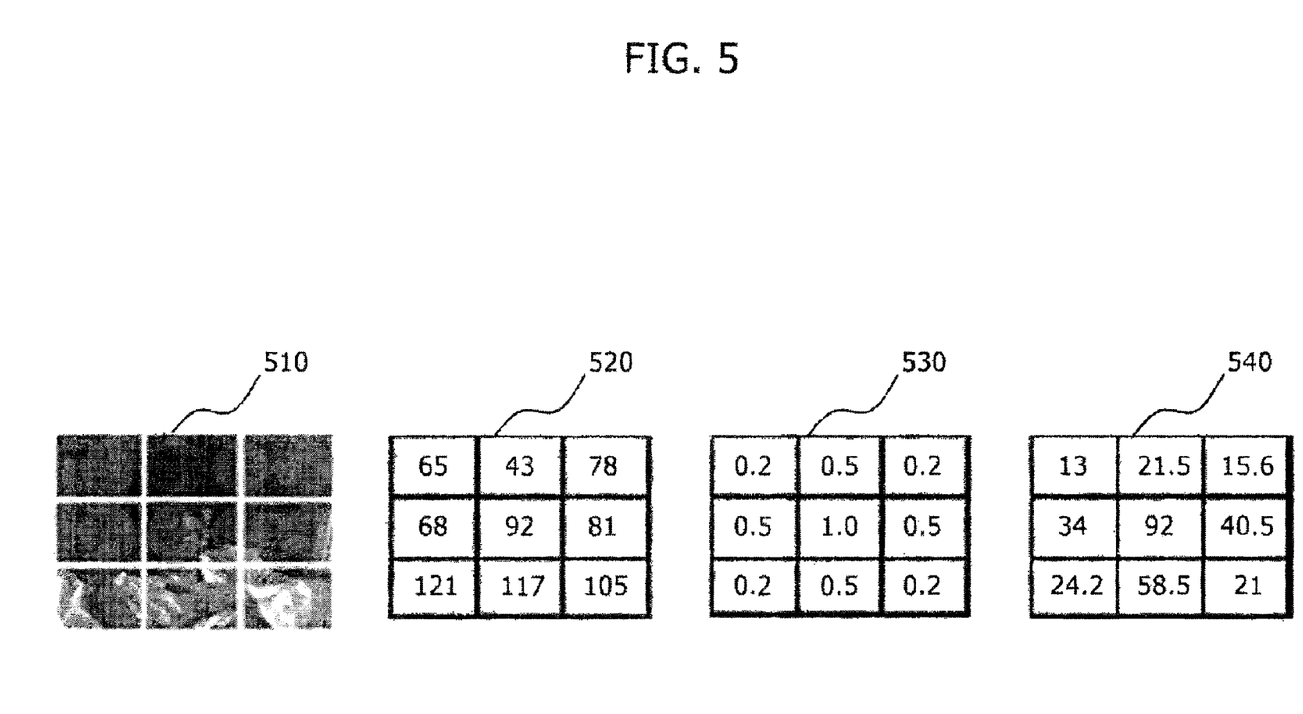
FIG. 5 is a conceptual diagram illustrating a process of applying weights to blocks of the frame in accordance with an embodiment of the present invention.

FIG. 5 is a conceptual diagram illustrating a process of applying weights to blocks of the frame in accordance with an embodiment of the present invention.

Considering characteristic of image edition in FIG. 4, each image frame is partitioned into 3×3 image blocks. A spatial weight is applied to each block. 1.0 is applied to a center block, 0.5 is applied to a top block, a bottom block, a left block and a right block of the center block, and 0.2 is applied to the others. The reference numeral 510 denotes an image that is an original image partitioned into 3×3 image blocks. The reference numeral 520 denotes average luminance values of the 3×3 blocks. The reference numeral 530 denotes weight values of the 3×3 blocks t be applied to the average luminance values. The reference numeral 540 denotes values generated by multiplying the weight values denoted by the reference numeral 530 by the average luminance values of the blocks denoted by the reference numeral 520.

<Luminance Component Analysis>

In an embodiment of the present invention, a video frame in which abrupt change of luminance occurs in temporal domain is defined as a keyframe. In this embodiment, spatio-temporal feature is extracted based on the keyframe.

Figure 6:
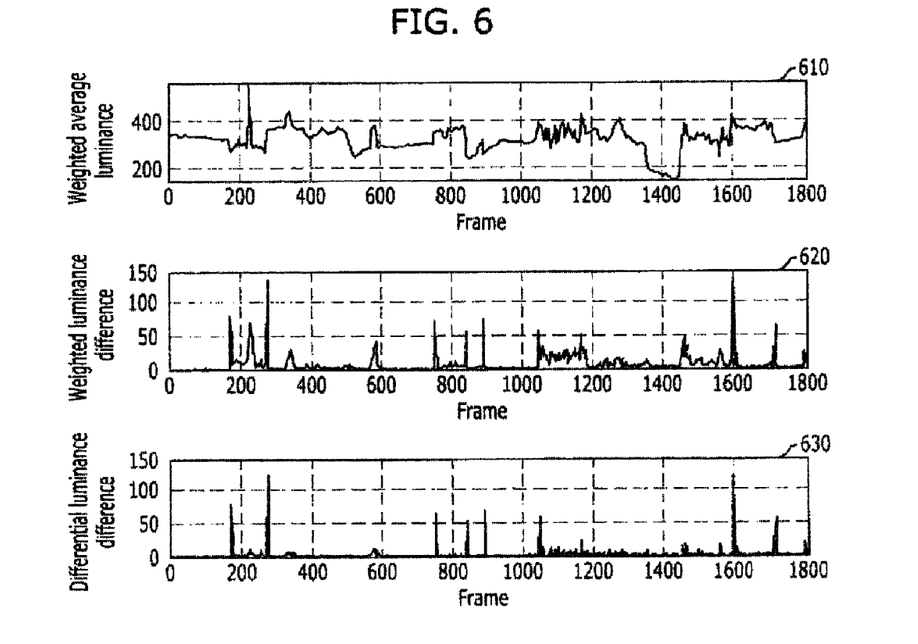
FIG. 6 is a diagram illustrating three types of luminance information according to temporal conversion of one-minute video.

FIG. 6 is a diagram illustrating three types of luminance information according to temporal conversion of one-minute video.

A graph 610 shows the temporal variation of the weighted average luminance of each frame as defined in Eq. 1. A graph 620 shows the temporal variation of the weighted luminance difference that is a difference between the weighted average luminance of the previous frame and the weighted average luminance of the current frame. The weighted luminance difference is expressed as a following equation Eq. 2. A graph 630 shows the temporal variation of differential luminance difference that is computed based on Eq. 3.

$$F_w(t) = \sum_{i=1}^{9} w(i) F(t, i) \qquad \text{Eq. 1}$$

$$\Delta_w(t) = \sum_{i=1}^{9} w(i) \Delta(t, i) \qquad \text{Eq. 2}$$

$$\Delta'(t) = \Delta_w(t) - \Delta_w(t-1) \qquad \text{Eq. 3}$$

In Eq. 1, F(t,i) is the averaged luminance value of ith block of tth frame, and w(i) is the weight value of ith block. In Eq. 2, $\Delta$(t,i) is the luminance difference of ith block of tth frame, which is a difference between the average luminance of ith block of tth frame and the average luminance of ith block of (t−1)th frame, and is expressed as $\Delta(t,i) = |F(t,i) - F(T-1,i)|$. Also, $\Delta_w(t)$ is the luminance difference of ith block of tth frame to which a weight w(i) is applied. In Eq. 3, $\Delta'(t)$ is the temporal variation of $\Delta_w(t)$, which is the differential luminance difference. Although the differential luminance difference $\Delta'(t)$ actually has a positive number as well as a negative number, in this embodiment, only the differential luminance difference having the positive number is considered and the negative number is excluded from calculation.

Comparing the graph 620 with the graph 630, both graphs have peaks that show abrupt change of luminance. However, the graph 630 shows a difference between the luminance difference of the previous frame and the luminance difference of the current frame apparently. This is the reason that the differential luminance difference $\Delta'(t)$ is affected by luminance change of previous frame while the luminance difference $\Delta_w(t)$ is influenced by only current luminance change regardless of luminance change of previous frame. Thus, the differential luminance difference $\Delta'(t)$ is more efficient to detect abrupt change of luminance. For example, if the luminance change of the previous frame is large, the great change of the luminance of the present frame is not considered as abrupt change. On the other hand, if the luminance change of the previous frame is small, great change of the luminance of the current frame means abrupt change of the luminance of the present frame. Therefore, a feature extraction method using the differential luminance difference reduces probability that a different keyframe from the original video is selected at keyframe selection process when the luminance component is changed according to various video edition effects. That is, the feature extraction method mentioned above contributes to robustness improvement of video copy detection algorithm.

<Keyframe Selection through Applying Local Threshold>

Figure 7:
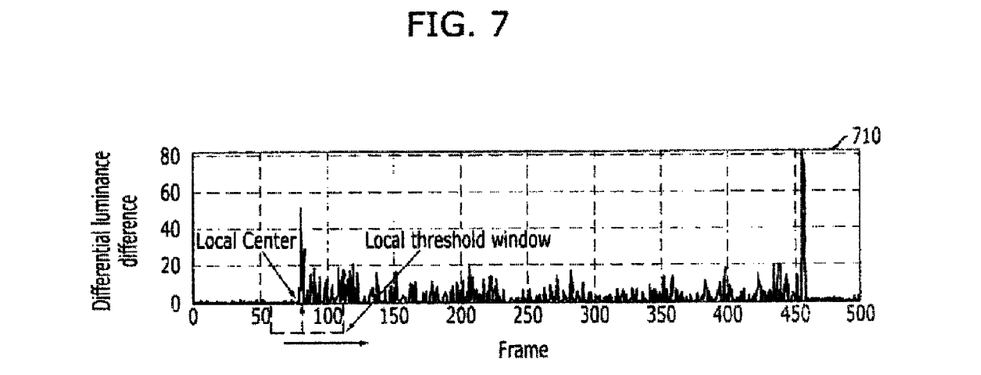
FIG. 7 is a diagram showing that a local threshold is applied to differential luminance difference.

FIG. 7 is a diagram showing that a local threshold is applied to differential luminance difference.

Since a local threshold is adopted to find a keyframe with abrupt change of the luminance, the present invention is effective to reduce sensitivity for change of luminance. Moving a local center of a local threshold window having constant time length (local region) along a temporal axis by a frame-by-frame basis, the local threshold is applied on the basis of the local center. That is, local threshold windows are divided on the basis of the current frame to be examined, and a previous local threshold value and a next local threshold value are calculated. When the differential luminance difference of the current frame exceeds either the previous local threshold value or the next local threshold value, it is considered as abrupt luminance change.

In FIG. 7, the abrupt luminance change in the 80th frame exceeds threshold in prior region and abrupt luminance changes in the 460th frame exceeds threshold in posterior region. A process of detecting a keyframe $\hat{F}_n$ by applying the local threshold to differential luminance difference $\Delta'(t)$ is expressed by Eq. 4.

$$\hat{F}_n = \{F(t) \mid \Delta'(t) > \alpha T_L(t), 1 \le t \le U\},$$

$$T_L(t) = \min\left[\frac{1}{L}\sum_{i=1}^{L}\Delta'(t-i), \frac{1}{L}\sum_{i=1}^{L}\Delta'(t+i)\right]$$

Eq. 4

In Eq. 4, L is the number of video frames which are used as a local region for the local threshold window. $\alpha$ is a parameter used to compare the differential luminance difference with the local threshold to find a key frame. U is the total number of the video frames. $T_L(t)$ is a smaller value between the prior average differential luminance difference and the posterior differential luminance difference on the basis of the local center in the local threshold window.

<Spatio-Temporal Feature Extraction>

The keyframe $\hat{F}_n$ is obtained by applying local threshold process, and then a temporal interval $D_n$ between the previous keyframe and the current keyframe is computed by using a following equation Eq. 5.

$$D_n = I[\hat{F}_n] - I[\hat{F}_{n-1}]$$

Eq. 5

In Eq. 5, I[•] is a function that presents the sequence number of the frame. For example, when 10th frame (t=10) of video is the first keyframe $\hat{F}_0$ and 15th frame (t=15) is the second keyframe $\hat{F}_1$, the distance $D_1$ between two keyframes is five. Since 30 frames per a second are described as an example in this embodiment, the distance 10 means a time interval having about 0.3 sec. If the number of the frames per a second of the query video is different from that of the reference video, the distance should be converted based on 30 frames per a second.

Finally, the weighted luminance differences $\hat{\Delta}_w(n,m)$ of 9 (3×3) blocks in each keyframe and a distance $D_n$ between the previous key and the current keyframe are defined as the spatio-temporal feature for video copy detection. The spatio-temporal feature is expressed by an equation Eq. 6.

$$S_n = \{\hat{\Delta}_w(n,1), \hat{\Delta}_w(n,2), \hat{\Delta}_w(n,3), \ldots, \hat{\Delta}_w(n,9), D_n\} \text{ for } n=1, \ldots, N.$$

Eq. 6

In Eq. 6, $\hat{\Delta}_w(n,m)$ is different from the luminance difference $\Delta(t,i)$ of the general frame (i.e., not keyframe) expressed by Eq. 2. $\hat{\Delta}_w(n,m)$ denotes weighted luminance difference of the mth block of the nth keyframe $\hat{F}_n$. N is the total number of keyframes.

<Comparison of Features>

If the query video is a duplication of the reference video, spatio-temporal features of two videos are identical. Thus, by comparing the feature of the query video with the feature of the reference video, it can determine whether the query video is copied or not. Here, when the duplication is entirely copied, keyframes of the query video and the reference video are identical to each other. When the duplication is partially copied, a part of the keyframe of the query video is identical to that of keyframe of the reference video.

Figure 8:
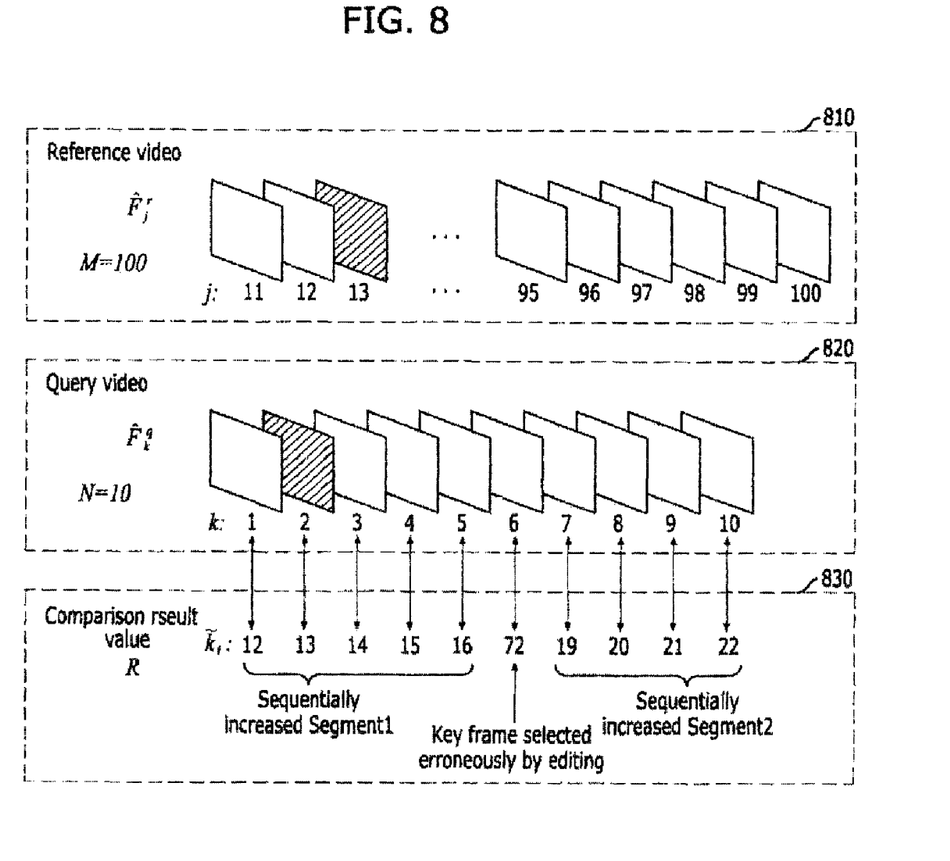
FIG. 8 is a diagram illustrating a process of comparing features of the query video and the reference video.

FIG. 8 is a diagram illustrating a process of comparing the feature of the query video and that of the reference video.

A reference numeral 810 denotes frames of a reference video. A reference numeral 820 denotes frames of a query video. A reference numeral 830 denotes a method comparing the reference video 810 with the query video 820. $\hat{F}_k^q$ and $\hat{F}_j^r$ are keyframes of the query video and the reference video, where k and j are sequence numbers of the keyframes. R is a comparison result value obtained by comparing features between the keyframe of the query video and the keyframe of the reference video. As shown in FIG. 8, the query video has 10 keyframes and the reference video has 100 keyframes, a keyframe having the most similar feature is found by sequentially comparing the feature of the second keyframe of the query video with those of all keyframes of the reference video. Eqs. 7 and 8 represent the comparison process of features of two videos, and two equations are expressed as follows.

$$\hat{F}_k^q(k) \approx \hat{F}_j^r(j): \min\{Diff(k,j) \mid |D_k^q - D_j^r| < T_d\}, \text{ for } \forall j, \forall k$$

Eq. 7

$$Diff(k,j) = \sum_{i=0}^{1}\sum_{m=1}^{9}|\hat{\Delta}^q(k+i-1,m) - \hat{\Delta}^r(j+i-1,m)|$$

Eq. 8

Where $\hat{F}_k^q$ is the kth keyframe of the query video, and $\hat{F}_j^r$ is the jth keyframe of the reference video. $D_k^q$ is defined as a temporal distance between kth and k-1th keyframes of the query video, and $D_j^r$ is a temporal distance between the jth keyframe and j−1th keyframe of the reference video. $T_d$ is error tolerance of the temporal distance. In comparison difference value Diff( ) in Eq. 8, $\hat{\Delta}^q(k,m)$ is luminance difference of the mth block of the kth keyframe in the query video as described in Eq. 6, and $\hat{\Delta}^r(j,m)$ is luminance difference of the mth block of the jth keyframe in the reference video.

Referring to Eq. 7, the temporal distance between the previous keyframe and the current keyframe in the query video is compared with the temporal distance between the previous keyframe and the current keyframe in the reference video. When the difference of the temporal distances of the query video and the reference video is less than the error tolerance $T_d$, then a similarity between the query video and reference video is calculated based on the luminance difference spatio-temporal $\hat{\Delta}(n,m)$, which is a spatial feature. These processes make a similarity between the query video and reference video to be obtained based on both of spatial feature and temporal feature. In order to increase accuracy, luminance difference $\hat{\Delta}(n-1,m)$ of the previous keyframe is also compared. In this embodiment, it is assumed that the kth keyframe $\hat{F}_k^q$ of the query video that has the smallest value among the comparison result values is identical to the jth keyframe $\hat{F}_j^r$ of the reference video. Referring to FIG. 8, the 13th keyframe $\hat{F}_{13}^r$ of the reference video is the most similar to the second keyframe $\hat{F}_2^q$ of the query video through comparison of spatio-temporal feature. The comparison result value R can be computed by finding the most similar keyframe of the reference video for all keyframes of the query video. The comparison result value R is expressed as a following equation Eq. 9.

$$R = \{\hat{k}_1, \hat{k}_2, \hat{k}_3, \ldots, \hat{k}_N\},$$

$$\hat{k}_i \in \{1,2,3,\ldots,M\} \text{ for } i=1,\ldots,N$$

Eq. 9

Where N is the number of keyframes of the query video, M is the number of keyframes of the reference video. $\hat{k}_i$ is the sequence number of the keyframe of the reference video which is matched by comparing and measuring spatio-temporal feature. If the query video is the partially same as or identical to the reference video (partial duplication or total duplication), $\hat{k}_i$ is sequentially increased.

Figure 9:
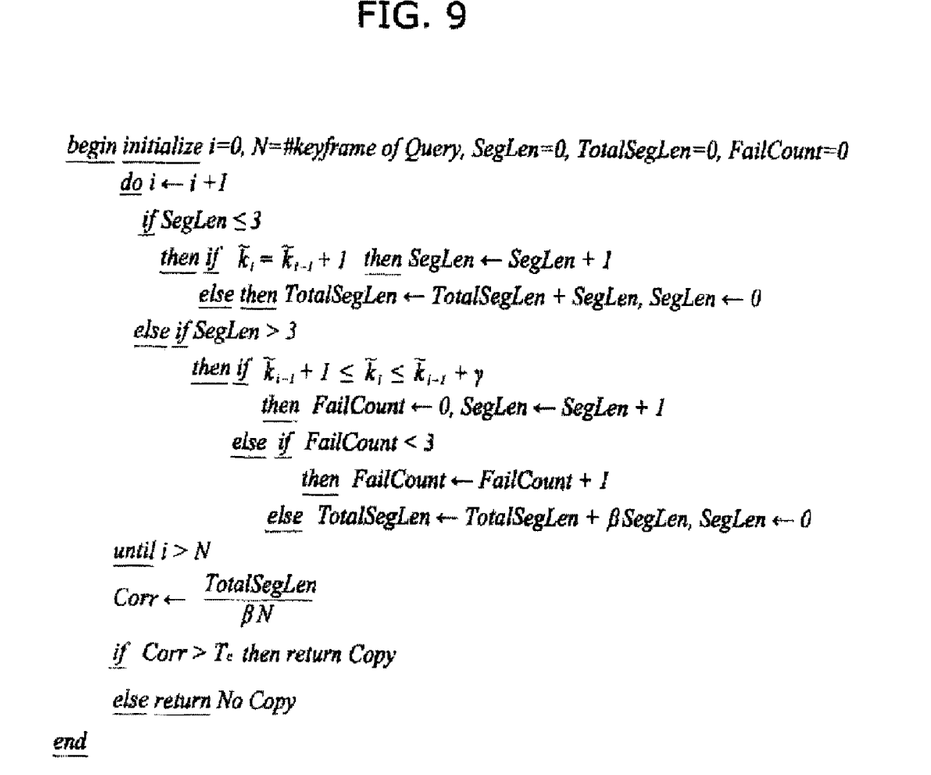
FIG. 9 is a diagram showing a process of computing similarity between the query video and the reference video.

FIG. 9 is a diagram showing a process of computing similarity between the query video and the reference video.

In FIG. 8, Segment in a comparison result value R is defined as a section where the number $\hat{k}_i$ is increased sequentially. For example, since in R, $\hat{k}_i$ increases sequentially, i.e., 12 to 16, in a section when i is 1 to 5, the set of keyframes in the section can be represented as Segment 1. Also, the section when i is 7 to 10 becomes Segment 2. In the computation process of FIG. 9, SegLen denotes a length of Segment. TotalSegLen denotes the sum of the lengths of all Segments. Although a query video and a reference video are identical to each other, if the query video is modified by edit effect, then an uncorrected keyframe would be selected as shown in FIG. 8. In that case, the comparison result value R is partitioned to several Segments, which decrease detection rate.

Therefore, in this embodiment, when $\hat{k}_i$ increases consecutively for 3 times (SegLen>3), it is assumed that the query video is very similar to the reference video, and the process performs error correction. The error correction permits that $\hat{k}_i$ is increased in a certain range (1~γ) although $\hat{k}_i$ does not consecutively increase, and that wrong keyframe is selected upto 3 times. Also, β times of the weight value is given to Segment length SegLen. Finally, the similarity Corr between two videos is obtained by using Eq. 10.

$$Corr = \frac{TotalSegLen}{\beta N} > T_c \qquad \text{Eq. 10}$$

In Eq. 10, N is the total frame number of a query video. In FIG. 9, FailCount denotes a value increasing when uncorrected keyframe is selected. Finally, "Copy" and "No Copy" is provided as a result of determination whether the query video is duplication of the reference video or not.

The feature extraction and decision method and apparatus can reduce processing time for video copy detection, and easily detect video copy even though the video edition effects are applied to the video.

While the present invention has been described with respect to the specific embodiments, it will be apparent to those skilled in the art that various changes and modifications may be made without departing from the spirit and scope of the invention as defined in the following claims.

What is claimed is:

1. An apparatus for extracting spatio-temporal feature and detecting video copy based on the same in a broadcasting communication system, comprising:
an original video feature extractor configured to receive an original video and extract spatio-temporal feature of the original video, the original video feature extractor comprising:
a unit configured to divide a frame of the original video into a plurality of blocks and calculate an average luminance value F(t,i) of each block, wherein F(t,i) is an average luminance value of an $i^{th}$ block of a $t^{th}$ frame;
a unit configured to generate a weighted average luminance value $F_w(t,i)$ of the frame by applying a spatial weight to the average luminance value in accordance to $$F_w(t, i) = \sum_{i=1}^{N} w(i) F(t, i)$$

wherein w(i) is the spatial weight assigned to the $i^{th}$ block, and N is a number corresponding to all of the blocks in the frame;
a unit configured to generate a differential luminance difference Δ'(t) of the frame by computing a difference between the weighted average luminance values of a previous frame $\Delta_w(t-1)$ and a current frame $\Delta_w(t)$ in accordance to $\Delta'(t) = \Delta_w(t) - \Delta_w(t-1)$ wherein $$\Delta_w(t) = \sum_{i=1}^{N} w(i) \Delta(t, i)$$

in which Δ(t,i) corresponds to a difference between an average luminance of an $i^{th}$ block of $t^{th}$ frame and the average luminance of the $i^{th}$ block of the $(t-1)^{th}$ frame and is expressed as $$\Delta(t, i) = |F(t, i) - F(t-1, i)|;$$

a unit configured to select the frame having abrupt luminance change when a local threshold is applied to the differential luminance difference Δ'(t) of the frame, as a keyframe of the original video; and
a unit configured to calculate spatio-temporal feature of the original video based on temporal and spatial characteristics of the keyframe;
an original video feature database configured to store the extracted feature;
a query video feature extractor configured to receive a query video and extract spatio-temporal feature of the query video; and
a feature comparison and decision unit configured to compare the spatio-temporal feature of the original video and the spatio-temporal feature of the query video and decide similarity of the original video and the query video based on the spatio-temporal features of the original video and the query video.

2. The apparatus of claim 1, further comprising: an original video provider configured to provide the original video.

3. The apparatus of claim 1, further comprising: a query video provider configured to provide the query video.

4. The apparatus of claim 1, wherein when the differential luminance difference Δ'(t) has a negative value then the differential luminance difference Δ'(t) is not used.

5. The apparatus of claim 1, wherein the query video feature extractor includes:
a unit configured to divide a frame of the query video into a plurality of blocks and calculate the average luminance value of each block F(t,i);
a unit configured to generate the weighted average luminance $F_w(t,i)$ value of the frame by applying the spatial weight w(i) to the average luminance value F(t,i);
a unit configured to generating the differential luminance difference Δ'(t) of the frame by computing difference between the weighted average luminance values of a previous frame $\Delta_w(t-1)$ and a current frame $\Delta_w(t)$;

a unit configured to select the frame having abrupt luminance change when a local threshold is applied to the differential luminance difference $\Delta'(t)$ of the frame, as a keyframe of the query video; and a unit configured to calculate spatio-temporal feature of the query video based on temporal and spatial characteristics of the keyframe.

6. The apparatus of claim 5, wherein said feature comparison and decision unit includes:

a feature comparator configured to compare the extracted spatio-temporal feature of the original video and the extracted spatio-temporal feature of the query video; and a calculating similarity between the original video and the query video and determining whether the query video is a copy of the original video or not based on the calculated similarity.

7. A method for extracting spatio-temporal feature for video copy detection in a broadcasting communication system, comprising:

dividing a video frame into N number of blocks and calculating an average luminance value $F(t,i)$ of the blocks each having a luminance value in which $F(t,i)$ is the average luminance value of an $i^{th}$ block of a $t^{th}$ frame, wherein video contents includes a plurality of video frames;

applying a spatial weight $w(i)$, assigned to each of the $i^{th}$ blocks, to the average luminance value $F(t,i)$, to thereby generate a value of a weighted average luminance in accordance to $$F_w(t, i) = \sum_{i=1}^{N} w(i)F(t, i)$$

of the video frame;

calculating differential luminance difference $\Delta'(t)$ of the weighted average luminance $F_w(t,i)$ value of the video frame by computing a difference between the weighted average luminance values of a previous frame $\Delta_w(t-1)$ and a current frame $\Delta_w(t)$ in accordance to $\Delta'(t)=\Delta_w(t)-\Delta_w(t-1)$ wherein $$\Delta_w(t) = \sum_{i=1}^{N} w(i)\Delta(t, i)$$

in which $\Delta(t,i)$ corresponds to a difference between an average luminance of an $i^{th}$ block of $t^{th}$ frame and the average luminance of the $i^{th}$ block of the $(t-1)^{th}$ frame and is expressed as $$\Delta(t, i) = |F(t, i) - F(t-1, i)|;$$

selecting the video frame having abrupt luminance change when a local threshold is applied to the differential luminance difference $\Delta'(t)$ of the video frame, as a keyframe of the video contents; and calculating spatio-temporal feature of the video contents based on temporal and spatial characteristic of the keyframe.

8. The method of claim 7, wherein the spatial weight is a predetermined value, a different value is assigned to each of the blocks as the spatial weight of the block based on importance of the block.

9. The method of claim 7, wherein the blocks of the video frame are divided into three groups, a center block; a top block, a bottom block, a left block and a right block of the center block; and the others, and the same spatial weight is assigned to the blocks in the same group.

10. The apparatus of claim 1, wherein the frame of the original video is partitioned into 3×3 blocks such that N is 9.

11. The apparatus of claim 10, wherein the blocks comprise a center block, a top block relative to the center block, a bottom block relative to the center block, a left block relative to the center block and a right block relative to the center block, and remaining diagonal blocks relative to the center block.

12. The apparatus of claim 11 wherein a spatial weight of 1.0 is assigned to the center block, a spatial weight of 0.5 is assigned to the top block, the bottom block, the left block and a right block; and a spatial weight of 0.2 is assigned to the remaining diagonal blocks.

13. An apparatus for extracting spatio-temporal feature and detecting video copy based on the same in a broadcasting communication system, comprising:

an original video feature extractor configured to receive an original video and extract spatio-temporal feature of the original video, the original video feature extractor comprising:

a unit configured to divide a frame of the original video into a plurality of blocks and calculate an average luminance value $F(t,i)$ of each block, wherein $F(t,i)$ is an average luminance value of an $i^{th}$ block of a $t^{th}$ frame;

a unit configured to generate a weighted average luminance value $F_w(t,i)$ of the frame of the original video by applying a spatial weight to the average luminance value in accordance to $$F_w(t, i) = \sum_{i=1}^{N} w(i)F(t, i)$$

wherein $w(i)$ is the spatial weight assigned to the $i^{th}$ block, and N is a number corresponding to all of the blocks in the frame of the original video;

a unit configured to generate a differential luminance difference $\Delta'(t)$ of the frame of the original video by computing a difference between the weighted average luminance values of a previous frame $\Delta_w(t-1)$ of the original video and a current frame $\Delta_w(t)$ of the original video in accordance to $\Delta'(t)=\Delta_w(t)-\Delta_w(t-1)$ wherein $$\Delta_w(t) = \sum_{i=1}^{N} w(i)\Delta(t, i)$$

in which $\Delta(t,i)$ corresponds to a difference between an average luminance of an $i^{th}$ block of $t^{th}$ frame and the average luminance of the $i^{th}$ block of the $(t-1)^{th}$ frame of the original video and is expressed as $$\Delta(t, i) = |F(t, i) - F(t-1, i)|;$$

a unit configured to select the frame of the original video having abrupt luminance change when a local threshold is applied to the differential luminance difference Δ'(t) of the frame of the original video, as a keyframe of the original video; and
   a unit configured to calculate spatio-temporal feature of the original video based on temporal and spatial characteristics of the keyframe of the original video;
an original video feature database configured to store the extracted feature;
a query video feature extractor configured to receive a query video and extract spatio-temporal feature of the query video, wherein the query video feature extractor includes:
   a unit configured to divide a frame of the query video into a plurality of blocks and calculate the average luminance value of each block F(t,i);
   a unit configured to generate the weighted average luminance $F_w(t,i)$ value of the frame of the query video by applying the spatial weight w(i) to the average luminance value F(t,i);
   a unit configured to generating the differential luminance difference Δ'(t) of the frame of the query video by computing difference between the weighted average luminance values of a previous frame $\Delta_w(t-1)$ of the query video and a current frame $\Delta_w(t)$ of the query video;
   a unit configured to select the frame of the query video having abrupt luminance change when a local threshold is applied to the differential luminance difference Δ'(t) of the frame of the query video, as a keyframe of the query video; and
   a unit configured to calculate spatio-temporal feature of the query video based on temporal and spatial characteristics of the keyframe of the query video; and
a feature comparison and decision unit configured to compare the spatio-temporal feature of the original video and the spatio-temporal feature of the query video and decide similarity of the original video and the query video based on the spatio-temporal features of the original video and the query video.

14. The apparatus of claim 13, wherein the feature comparison and decision unit comprises:
   a feature comparator configured to compare the extracted spatio-temporal feature of the original video and the extracted spatio-temporal feature of the query video; and
   a calculating similarity between the original video and the query video and determining whether the query video is a copy of the original video or not based on the calculated similarity.

15. The apparatus of claim 13, wherein the frame of the original video is partitioned into 3×3 blocks such that N is 9.

16. The apparatus of claim 15, wherein the blocks comprise a center block, a top block relative to the center block, a bottom block relative to the center block, a left block relative to the center block and a right block relative to the center block, and remaining diagonal blocks relative to the center block.

17. The apparatus of claim 16, wherein a spatial weight of 1.0 is assigned to the center block, a spatial weight of 0.5 is assigned to the top block, the bottom block, the left block and a right block; and a spatial weight of 0.2 is assigned to the remaining diagonal blocks.

18. The apparatus of claim 13, wherein the frame of the query video is partitioned into 3×3 blocks such that N is 9.

19. The apparatus of claim 18, wherein the blocks comprise a center block, a top block relative to the center block, a bottom block relative to the center block, a left block relative to the center block and a right block relative to the center block, and remaining diagonal blocks relative to the center block.

20. The apparatus of claim 19, wherein a spatial weight of 1.0 is assigned to the center block, a spatial weight of 0.5 is assigned to the top block, the bottom block, the left block and a right block; and a spatial weight of 0.2 is assigned to the remaining diagonal blocks.

* * * * *